(12) United States Patent
Ekholm et al.

(10) Patent No.: US 6,712,959 B2
(45) Date of Patent: Mar. 30, 2004

(54) SUBMERGED INTAKE FILTER ASSEMBLY

(75) Inventors: Michael R. Ekholm, Minneapolis, MN (US); Michael D. Appel, Mahtomedi, MN (US); Richard C. Maxson, Maple Grove, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/925,795

(22) Filed: Aug. 9, 2001

(65) Prior Publication Data

US 2003/0029780 A1 Feb. 13, 2003

(51) Int. Cl.⁷ .............................. B01D 29/33
(52) U.S. Cl. ............. 210/162; 210/170; 210/460; 210/461; 405/127
(58) Field of Search ............... 210/161, 162, 210/170, 434, 459, 460, 461; 405/127

(56) References Cited

U.S. PATENT DOCUMENTS

| | | |
|---|---|---|
| 415,927 A * | 11/1889 | Stiles ..................... 210/460 |
| 705,364 A | 7/1902 | Kurtz |
| 1,274,121 A | 7/1918 | White |
| 2,249,020 A | 7/1941 | McFarlin |
| 2,572,173 A | 10/1951 | McFarlin |
| 2,957,579 A | 10/1960 | McCombie |
| 3,037,636 A | 6/1962 | McFarlin |
| 4,261,822 A | 4/1981 | Richardson |
| 4,822,486 A | 4/1989 | Wilkins et al. |
| 6,051,131 A | 4/2000 | Maxson |
| 6,066,253 A * | 5/2000 | Idlund et al. ............... 210/460 |

* cited by examiner

Primary Examiner—Christopher Upton
(74) Attorney, Agent, or Firm—Moser, Patterson & Sheridan, L.L.P.

(57) ABSTRACT

A submerged intake filter assembly comprising a cylindrical screen, a first end plate, a second end plate, a primary flow modifier pipe, and a plurality of secondary flow modifier pipes. The primary flow modifier pipe is eccentric with the cylindrical screen at the first end plate. The secondary flow modifier pipes are positioned to lie in an annular space between the primary flow modifier pipe and the cylindrical screen.

31 Claims, 5 Drawing Sheets

SUBMERGED INTAKE FILTER ASSEMBLY

BACKGROUND AND SUMMARY OF THE INVENTION

The present invention relates to water collection pipes placed in bodies of water such as lakes and rivers and used by major manufacturing plants, large cities, irrigation systems and power generation facilities, and particularly to filters that filter water entering the collection pipes. More particularly, the present invention relates to a filter assembly that provides for flow uniformity through a screen of the filter.

Conventional intake filter assemblies typically include an inlet pipe having an open end surrounded by and coupled to a cylindrical screen, which has a central axis that is the same as a longitudinal axis of the inlet pipe. In this way, the cylindrical screen is concentric with the inlet end of the inlet pipe. A typical intake filter assembly may also include a flow modifier pipe positioned concentrically within the inlet pipe and extending beyond the inlet pipe into the cylindrical screen. The flow modifier pipe helps evenly distribute the flow of water through the cylindrical screen over the length of the screen. See, for example, U.S. Pat. No. 6,051,131 to Maxson, the disclosure of which is incorporated by reference herein.

The flow through the cylindrical screen can be uneven over the length of the cylindrical screen. That is, the flow rate through one portion of the intake screen may be different than the flow rate through another portion of the intake screen. An intake filter assembly which more uniformly distributes the flow over the length of the cylindrical screen would be welcomed by users of such filters.

According to the present invention, a submerged intake filter assembly includes a cylindrical screen which has a screen longitudinal axis, a first end, a second end, and an inner screen surface. The submerged intake filter assembly also includes a first end plate and a second end plate coupled to the cylindrical screen at the first end and the second end, respectively. Thus, the first end plate and the second end plate together with the inner screen surface define an interior of the cylindrical screen. The submerged intake filter assembly also includes a primary flow modifier pipe with a diameter that is less than that of the cylindrical screen and a primary longitudinal axis that is parallel to the screen longitudinal axis. The primary flow modifier pipe extends into the interior of the cylindrical screen through the first end plate, thereby forming an annular space between the primary flow modifier pipe and the inner screen surface at the first end of the screen. The submerged intake filter assembly further includes a secondary flow modifier pipe positioned in the annular space and extending into the interior of the cylindrical screen.

In preferred embodiments, the primary flow modifier pipe is either concentric or eccentric with the cylindrical screen at the first end of the screen. A plurality of secondary flow modifier pipes is positioned in the annular space, and extend either the same or different distances into the interior of the cylindrical screen.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
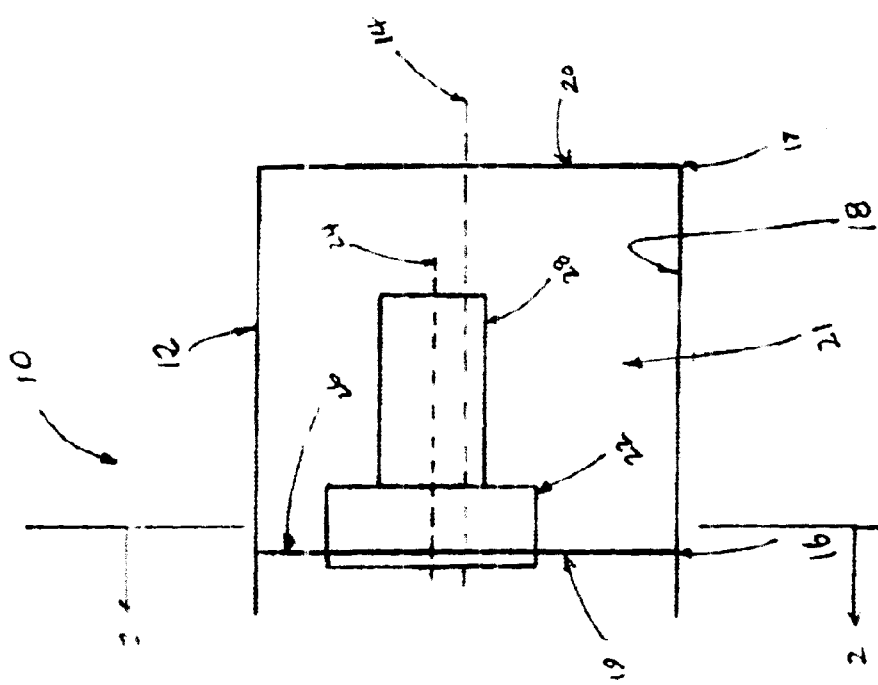
FIG. 1 is a side view, partially cut away, of a submerged intake filter assembly according to the present invention, showing a primary and a secondary flow modifier pipe eccentrically positioned within a cylindrical screen.

As shown in FIG. 1, a submerged intake filter assembly 10, according to a preferred embodiment of the present invention, includes a cylindrical screen 12, which has a screen longitudinal axis 14, a first end 16, a second end 17, and an inner screen surface 18. The submerged intake filter assembly 10 also includes a first end plate 19 and a second end plate 20 coupled to the cylindrical screen 12 at the first end 16 and the second end 17, respectively. Thus, the first end plate 19 and the second end plate 20, together with the inner screen surface 18, define an interior 21 of the cylindrical screen 12.

The submerged intake filter assembly 10 also includes a primary flow modifier pipe 22. The primary flow modifier pipe 22 has a diameter that is about 50% of the diameter of the cylindrical screen 12 and a primary longitudinal axis 24 that is parallel to and spaced-apart from the screen longitudinal axis 14. According to a preferred embodiment, the primary flow modifier pipe 22 extends into the interior 21 of the cylindrical screen 12 through the first end plate 19 approximately 16% of the distance between the first end 16 and the second end 17. The extension of the primary flow modifier pipe 22 into the interior 21 thereby forms an annular space 26 between the primary flow modifier pipe 22 and the inner screen surface 18 at the first end 16 of the cylindrical screen 12. A preferred embodiment of the submerged intake filter assembly 10 further includes a secondary flow modifier pipe 28 nested in the primary flow modifier pipe 22 and extending into the interior 21 of the cylindrical screen 12 approximately 67% of the distance between the first end 16 and the second end 17 of the cylindrical screen 12. The diameter of the secondary flow modifier pipe 28 is about 70% of the diameter of the primary flow modifier pipe 22. However, it will be readily apparent to those of ordinary skill in the art that the diameter of the primary and secondary flow modifier pipes and the distances they extend into the interior 21 may be varied.

Figure 2:
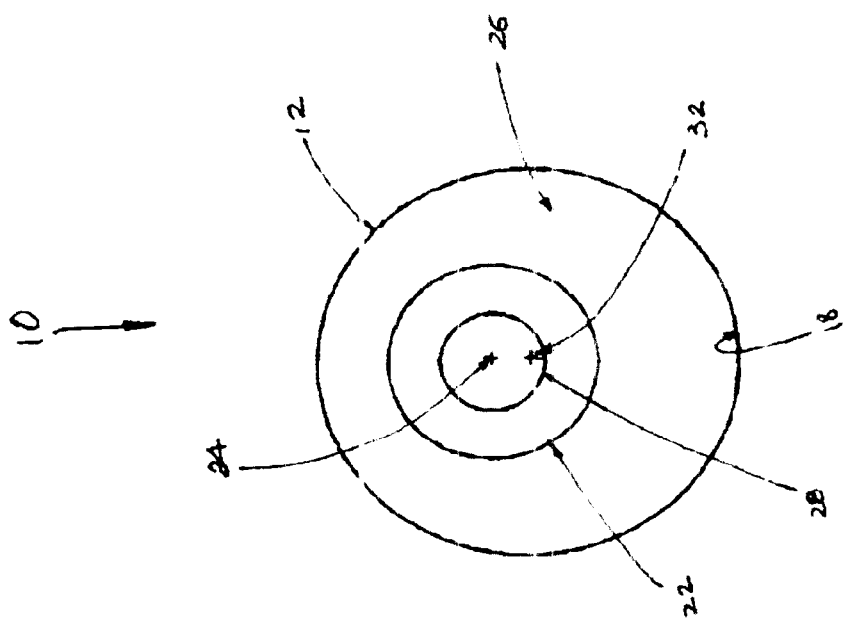
FIG. 2 is a sectional view of the submerged intake filter assembly of FIG. 1 taken along line 2—2 of FIG. 1.

FIG. 2 is a sectional view of the submerged intake filter assembly of FIG. 1 taken along line 2—2 of FIG. 1. The cylindrical screen 12 has a center 32 at the first end 16. The primary flow modifier pipe 22 and the secondary flow modifier pipe 28 are concentric at the first end 16 and have a center 34 that is spaced-apart from the center 32. In this way, the primary flow modifier pipe 22 and the secondary flow modifier pipe 28 are eccentric with the cylindrical screen 12, thus making irregular the annual space 26. It will be readily apparent to those of ordinary skill in the art that additional flow modifier pipes may be nested within the primary flow modifier pipe 22, as is shown in U.S. Pat. No. 6,051,131 to Maxson, the disclosure of which is incorporated by reference herein. However, the additional nested flow modifier pipes may also be positioned eccentrically according to the present invention.

Figure 3:
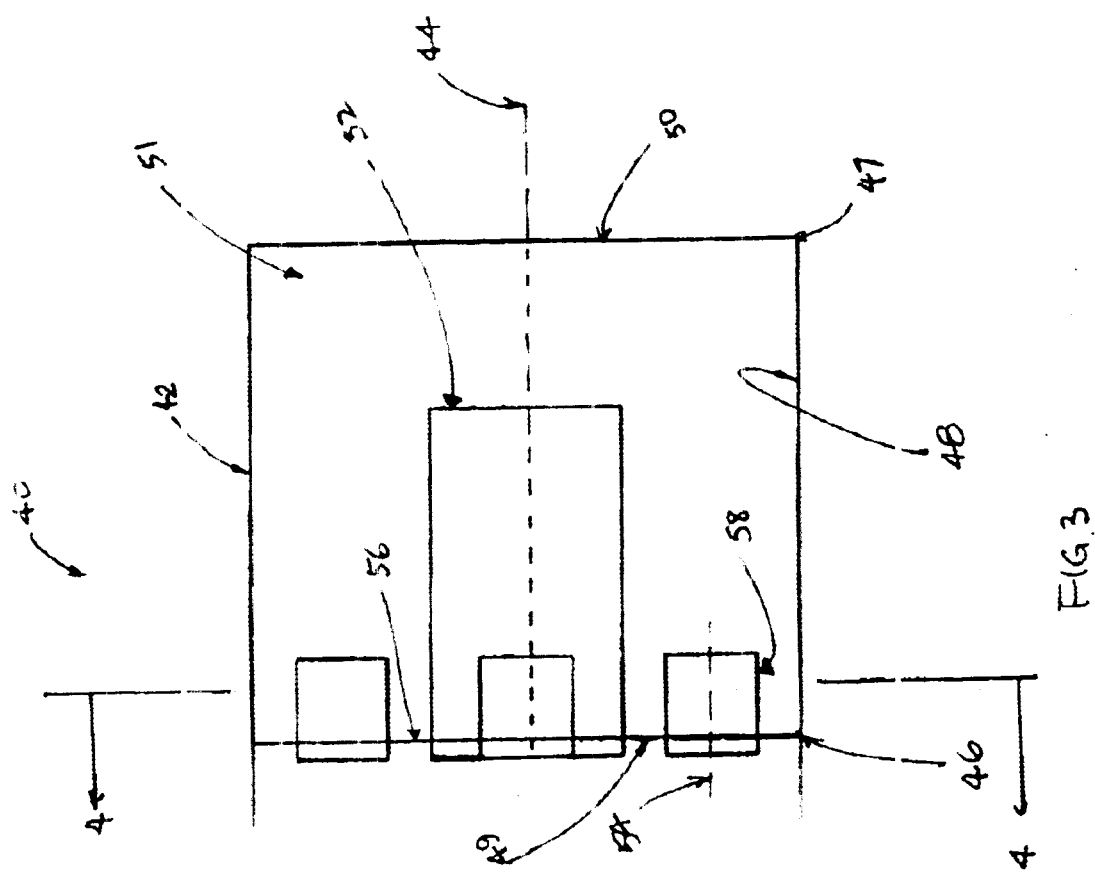
FIG. 3 is a side view, partially cut away, of another embodiment of a submerged intake filter assembly according to the present invention, showing a primary flow modifier pipe and a plurality of secondary flow modifier pipes positioned in an annular space surrounding the primary flow modifier pipe.

Referring to FIG. 3, another embodiment of a submerged intake filter assembly 40 according to the present invention includes a cylindrical screen 42, which has a screen longitudinal axis 44, a first end 46, a second end 47, and an inner screen surface 48. The submerged intake filter assembly 40 also includes a first end plate 49 and a second end plate 50 coupled to the cylindrical screen 42 at the first end 46 and the second end 47, respectively. Thus the first end plate 49 and the second end plate 50 together with the inner screen surface 48 define an interior 51 of the cylindrical screen 42.

The submerged intake filter assembly 40 also includes a primary flow modifier pipe 52 with a diameter less than 50% of the diameter of the cylindrical screen 42. The primary flow modifier pipe 52 extends through the first end plate 49 into the interior 51 of the cylindrical screen 42 at least 50% of the distance between the first end 46 and the second end 47 of the cylindrical screen 42. The primary flow modifier pipe 52 also shares the same longitudinal axis (the screen longitudinal axis 44) with the cylindrical screen 42. The extension of the primary flow modifier pipe 52 into the interior 51 forms an annular space 56 between the primary flow modifier pipe 52 and the inner screen surface 48 at the first end 46 of the cylindrical screen 42.

The submerged intake filter assembly 40 further includes a plurality of secondary flow modifier pipes 58 positioned in the annular space 56. The plurality of secondary flow modifier pipes 58 also extend through the first end plate 49 into the interior 51 of the cylindrical screen 42. As shown in FIG. 3, each secondary flow modifier pipe 58 extends into the interior 51 less than 50% of the distance between the first end 46 and the second end 48. However, it will be readily understood by those of ordinary skill in the art that the secondary flow modifier pipes 58 may all extend into the interior 51 a different distance than is shown in FIG. 3 and the secondary flow modifier pipes 58 may each extend different distances into the interior 51. Each of the plurality of secondary flow modifier pipes 58 has a secondary longitudinal axis 54 that is parallel to and spaced-apart from the screen longitudinal axis 44.

Figure 4:
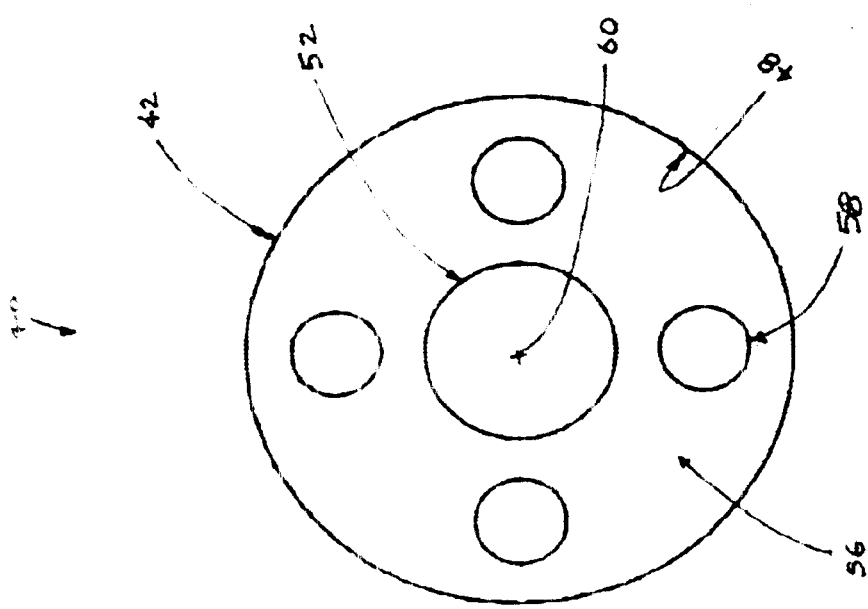
FIG. 4 is a sectional view of the submerged intake filter assembly of FIG. 3 taken along line 4—4 of FIG. 3.

FIG. 4 is a sectional view of the submerged intake filter assembly of FIG. 3 taken along line 4—4 of FIG. 3. The plurality of secondary flow modifier pipes 58 are positioned in the annular space 56 and form a concentric circle about a center 60 of the cylindrical screen 42 and the primary flow modifier pipe 52. In this way, the annular space 56 is constant around the primary flow modifier pipe 52, and the secondary flow modifier pipes 58 are regularly positioned around the primary flow modifier pipe 52. However, given the discussion above with respect to FIGS. 1 and 2, it will be readily apparent to those of ordinary skill in the art that the center of the primary flow modifier pipe 52 may be offset from the center of the screen 42 to create an irregular annular space around the primary flow modifier pipe 52, and the secondary flow modifier pipes 58 may be irregularly positioned around the primary flow modifier pipes. Referring again to FIG. 4, the diameter of the concentric circle formed by the secondary flow modifier pipes 58 is greater than the diameter of the primary flow modifier pipe 52, but less than the diameter of the cylindrical screen 42.

Figure 5:
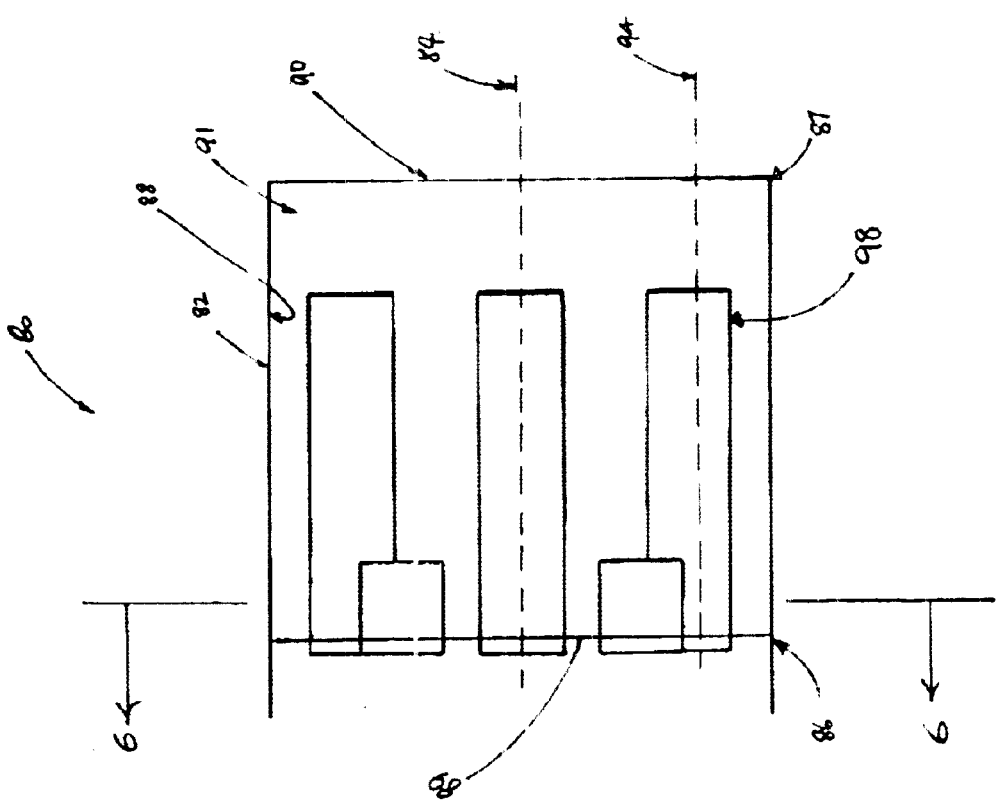
FIG. 5 is a side view, partially cut away, of yet another embodiment of a submerged intake filter assembly according to the present invention, showing a plurality of flow modifier pipes forming a circle centered about a screen longitudinal axis.

Referring to FIG. 5, yet another embodiment of a submerged intake filter assembly 80 according to the present invention includes a cylindrical screen 82, which has a primary longitudinal axis 84, a first end 86, a second end 87, and an inner screen surface 88. The submerged intake filter assembly 80 also includes a first end plate 89 and a second end plate 90 coupled to the cylindrical screen 82 at the first end 86 and the second end 88, respectively. Thus the first end plate 89 and the second end plate 90 together with the inner screen surface 88 define an interior 91 of the cylindrical screen 82.

The submerged intake filter assembly 80 also includes a plurality of flow modifier pipes 98 each having a diameter less than 50% of the diameter of the cylindrical screen 82. Each of the plurality of flow modifier pipes 98 has a longitudinal axis 94 that is parallel to and spaced-apart from the screen longitudinal axis 84. Each of the plurality of flow modifier pipes 98 extends through the first end plate 89 into the interior 91 of the cylindrical screen 82. The plurality of flow modifier pipes 98 extend different distances into the interior 91. Some of the flow modifier pipes 98 extend into the interior 91 more than 50% of the distance between the first end 86 and the second end 87 of the cylindrical screen 82. As shown in FIG. 5, others extend into the interior 91 less than 50% of the distance between the first end 86 and the second end 88 of the cylindrical screen 82. According to a preferred embodiment, the plurality of flow modifier pipes 98 are arranged in alternating lengths. However, it will be readily understood by those of ordinary skill in the art that each of the plurality of flow modifier pipes 98 may extend a different distance into the interior 91 than is shown in FIG. 5, including all extending an equal distance into the interior 91.

Figure 6:
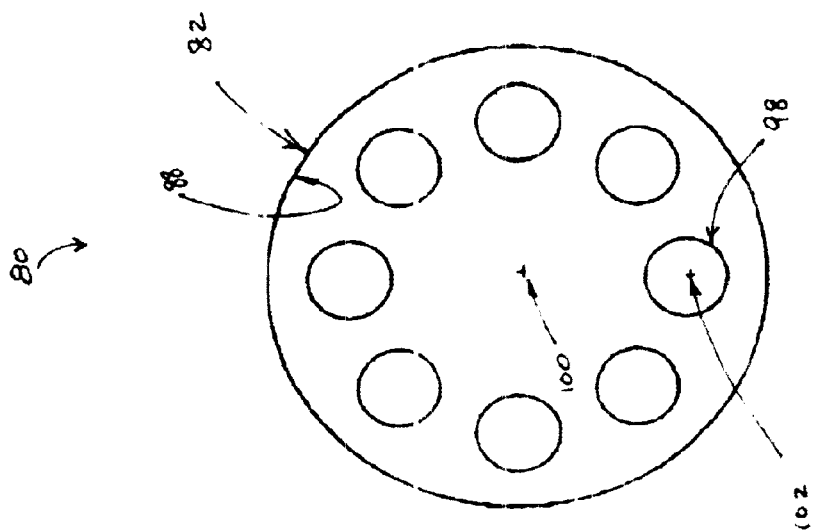
FIG. 6 is a sectional view of the submerged intake filter assembly of FIG. 5 taken along line 6—6 of FIG. 5.

FIG. 6 is a sectional view of the submerged intake filter assembly of FIG. 5 taken along line 6—6 of FIG. 5. Each of the plurality of secondary flow modifier pipes 98 has a center 102 which is spaced-apart from the center 100. The plurality of secondary flow modifier pipes 98 are evenly spaced on a circle which is concentric with the cylindrical screen 82. However, given the discussion above with respect to FIGS. 1 and 2, it will be readily apparent to those of ordinary skill in the art that the center of the plurality of flow modifier pipes 98 may be offset from the center 100, and the plurality of flow modifier pipes 98 may also form a different shape (other than a circle) and be unevenly spaced on the shape formed. Referring again to FIG. 6, the diameter of the concentric circle formed by the plurality of flow modifier pipes 98 is less than the diameter of the cylindrical screen 82.

Figure 7:
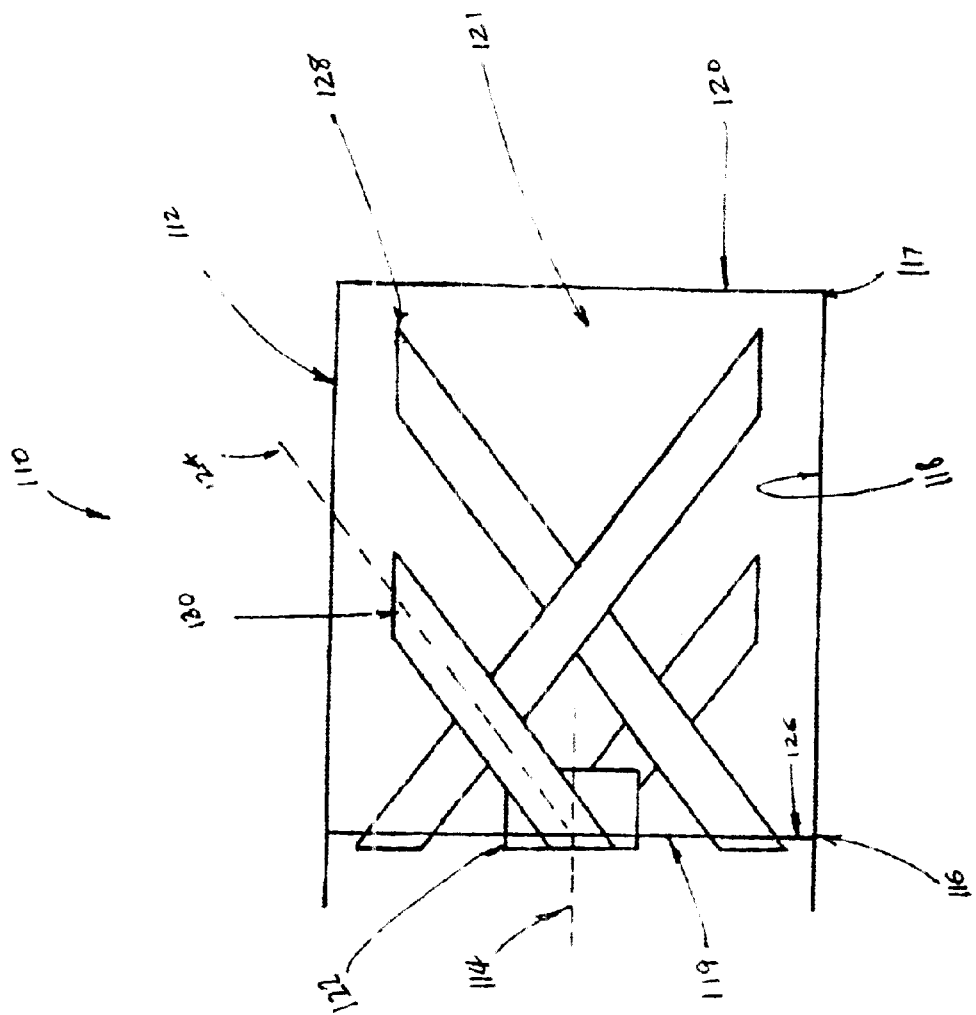
FIG. 7 is a side view, partially cut away, of still another embodiment of a submerged intake filter assembly according to the present invention, showing a primary flow modifier pipe and a plurality of secondary flow modifier pipes of different lengths and positioned at an angle to a screen longitudinal axis.

Referring to FIG. 7, still another embodiment of a submerged intake filter assembly 110 according to the present invention includes a cylindrical screen 112 which has a screen longitudinal axis 114, a first end 116, a second end 117, and an inner screen surface 118. The submerged intake filter assembly 110 also includes a first end plate 119 and a second end plate 120 coupled to the cylindrical screen 112 at the first end 116 and the second end 117, respectively. Thus the first end plate 119 and the second end plate 120 together with the inner screen surface 118 define an interior 121 of the cylindrical screen 112.

The submerged intake filter assembly 110 also includes a primary flow modifier pipe 122 with a diameter less than 50% of the diameter of the cylindrical screen 112. The primary flow modifier pipe 122 shares the same longitudinal axis (the screen longitudinal axis 114) with the cylindrical screen. The primary flow modifier pipe 122 also extends through the first end plate 119 into the interior 121 of the cylindrical screen 112 less than 50% of the distance between the first end 116 and the second end 117 of the cylindrical screen 112. The extension of the primary flow modifier pipe 122 into the interior 121 thereby forms an annular space 126 between the primary flow modifier pipe 122 and the inner screen surface 118 at the first end 116 of the cylindrical screen 112.

Figure 8:
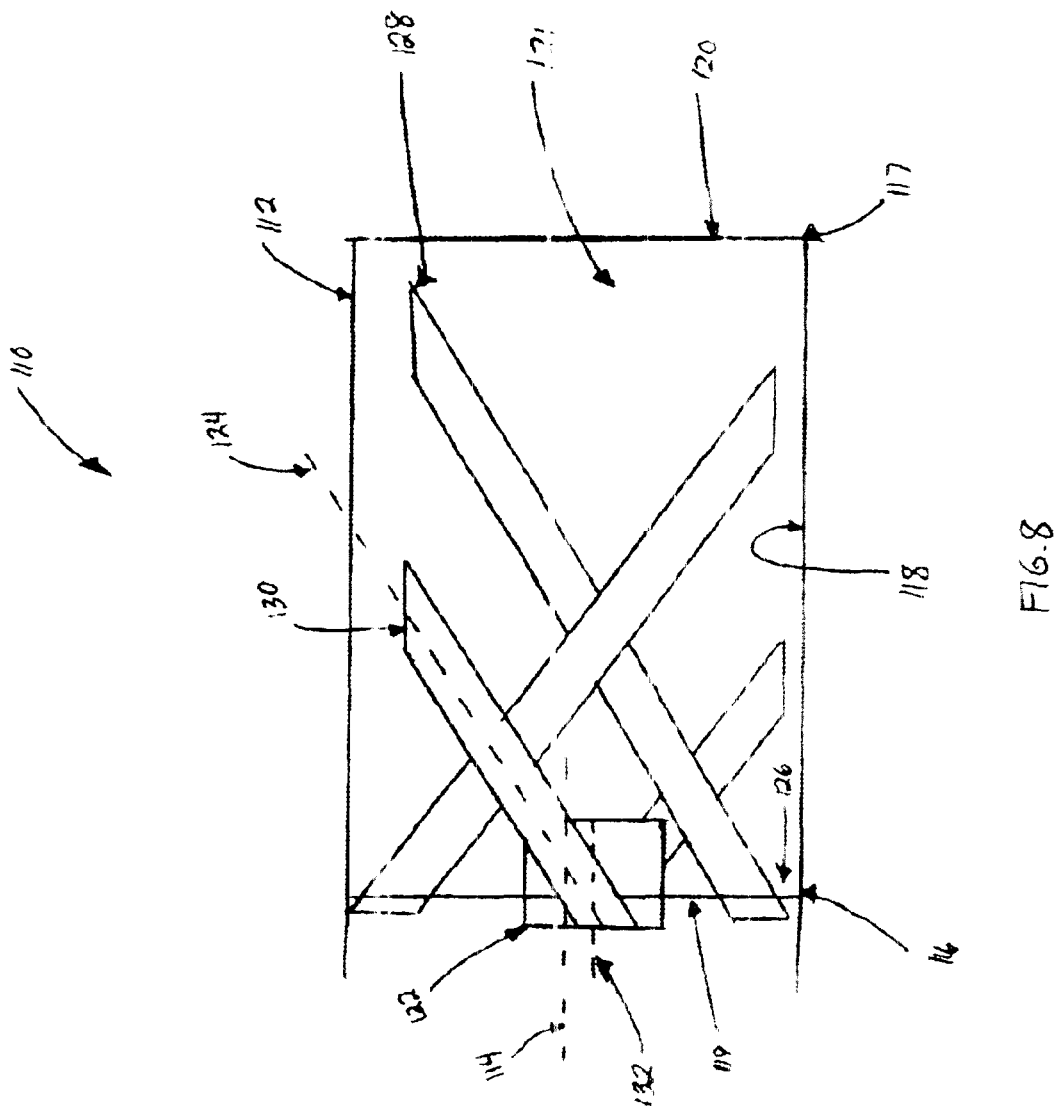
FIG. 8 is a side view of an embodiment of a submerged intake filter assembly showing a center of the primary modifier pipe offset from the screen longitudinal axis.

The submerged intake fitter assembly 110 further includes a plurality of secondary flow modifier pipes 128 positioned in the annular space 126. According to a preferred embodiment, at least one of the plurality of secondary flow modifier pipes 128 extends into the interior 121 more than 50% of the distance between the first end 116 and the second end 117 of the cylindrical screen 112. The secondary flow modifier pipes 128 each have a diameter that is less than the diameter of the primary flow modifier pipe 122. Furthermore, each of the plurality of secondary flow modifier pipes 128 has a secondary longitudinal axis 124 that is at an angle to the screen longitudinal axis 114. The plurality of secondary flow modifier pipes 128 form a circle with a diameter that Is greater than the diameter of the primary flow modifier pipe 122, but less than that of the cylindrical screen 112. Each of the plurality of secondary flow modifier pipes 128 Is bevel cut at an interior end 130 substantially to an angle that makes the interior end 130 parallel to the cylindrical screen 112. Each of the plurality of secondary flow modifier pipes 128 is bevel cut at a length that makes the interior end 130 of each pipes 128 equidistant from the cylindrical screen 112. However, it will be readily apparent to those of ordinary skill in the art that the diameter of the primary and secondary flow modifier pipes, the angles between the screen longitudinal axis 114 and the plurality of secondary flow modifier pipes 128, and the distances they extend into the interior 121 may be varied. Moreover, given the discussion above with respect to FIGS. 1 and 2, the center of the plurality of secondary flow modifier pipes 128 may be offset from the screen longitudinal axis 114 (as may be a center 132 of the primary flow modifier pipe 122, as illustrated In FIG. 8), and the plurality of secondary flow modifier pipes 128 may be arranged in a different shape (other than a circle) on the second end plate 119.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A submerged intake filter assembly comprising:
   a cylindrical screen having a screen longitudinal axis, a first end, and a second end, the cylindrical screen defining an interior between the first end and the second end;
   a primary flow modifier pipe having a diameter less than that of the cylindrical screen and a primary longitudinal axis parallel to the screen longitudinal axis, the primary flow modifier pipe extending Into the interior of the cylindrical screen through the first end of the cylindrical screen, thereby forming an annular space between the primary flow modifier pipe and the cylindrical screen, wherein the primary flow modifier pipe and the cylindrical screen are eccentric at the first end; and
   a secondary flow modifier pipe positioned in the annular space and extending into the interior of the cylindrical screen.

2. The submerged intake filter assembly of claim 1, wherein the secondary flow modifier pipe defines a secondary longitudinal axis that is at an angle to the primary longitudinal axis.

3. The submerged intake filter assembly of claim 2, further comprising a second secondary flow modifier pipe positioned in the annular space and extending into the interior of the cylindrical screen, the second secondary flow modifier pipe extending into the screen interior a different distance than the secondary flow modifier pipe.

4. The submerged intake filter assembly of claim 1, wherein the primary flow modifier pipe includes a primary inlet end and the secondary flow modifier pipe includes a secondary inlet end and the secondary inlet end extends further into the interior of the cylindrical screen than does the primary inlet end.

5. The submerged intake filter assembly of claim 4, further comprising a second secondary flow modifier pipe positioned in the annular space and extending into the interior of the cylindrical screen, the second secondary flow modifier pipe extending into the screen interior a different distance from the secondary flow modifier pipe.

6. The submerged intake filter assembly of claim 1, wherein the primary flow modifier pipe includes a primary inlet end and the secondary flow modifier pipe includes a secondary inlet end and the primary inlet end extends further into the interior of the cylindrical screen than does the secondary inlet end.

7. The submerged intake filter assembly of claim 6, further comprising a second secondary flow modifier pipe positioned in the annular space and extending into the interior of the cylindrical screen, the second secondary flow modifier pipe extending into the screen interior a different distance from the secondary flow modifier pipe.

8. The submerged intake filter assembly of claim 1, further comprising a second secondary flow modifier pipe having a second secondary longitudinal axis positioned in the annular space and extending into the interior of the cylindrical screen.

9. The submerged intake filter assembly of claim 8, wherein the secondary flow modifier pipe defines a secondary longitudinal axis, the secondary longitudinal axis and the second secondary longitudinal axis being positioned different distances from the primary longitudinal axis.

10. A submerged intake filter assembly, comprising:
    a cylindrical screen having a screen longitudinal axis, a first end, and a second end, the cylindrical screen defining an interior between the first end and the second end;

a primary flow modifier pipe having a primary longitudinal axis and extending into the interior of the cylindrical screen through the first end of the cylindrical screen, the screen longitudinal axis and the primary longitudinal axis being collinear and the cylindrical screen having a greater diameter than the primary flow modifier pipe, thereby creating an annular space between the primary flow modifier pipe and the first end of the screen; and a secondary flow modifier pipe positioned in the annular space and extending into the interior of the cylindrical screen, wherein the primary flow modifier pipe and the secondary flow modifier pipe are eccentric at the first end.

11. The submerged intake filter assembly of claim 10, wherein the primary flow modifier pipe includes a primary inlet end and the secondary flow modifier pipe includes a secondary inlet end and the secondary inlet end extends further into the interior of the cylindrical screen than does the primary inlet end.

12. The submerged intake filter assembly of claim 11, wherein the secondary flow modifier pipe includes a secondary longitudinal axis that is at an angle to the screen longitudinal axis.

13. The submerged intake filter assembly of claim 10, wherein the primary flow modifier pipe includes a primary inlet end and the secondary flow modifier pipe includes a secondary inlet end and the primary flow modifier pipe extends further into the interior of the cylindrical screen than does the secondary inlet end.

14. The submerged intake filter assembly of claim 13, wherein the secondary flow modifier pipe includes a secondary longitudinal axis that is at an angle to the screen longitudinal axis.

15. A submerged intake filter assembly, comprising:
   a round cylindrical screen having a first end, a second end, and an inside surface defining an interior between the first end and the second end;
   a round inlet pipe having an outer surface and an open end providing a passageway from outside the inlet pipe to inside the inlet pipe, the inlet pipe extending into the interior of the cylindrical screen through the first end of the cylindrical screen to create an annular space between the outer surface of the inlet pipe and the first end of the cylindrical screen;
   at least one secondary inlet pipe extending into the interior of the cylindrical screen;
   an end plate coupled to the cylindrical screen at the second end of the cylindrical screen and substantially closing the annular space between the outer surface of the inlet pipe and the first end of the cylindrical screen; and
   a base plate coupled to the inlet pipe and the cylindrical screen at the first end of the cylindrical screen and substantially closing the annular space between the outer surface of the inlet pipe and the first end of the cylindrical screen;
   wherein the round inlet pipe defines a first longitudinal central axis and the cylindrical screen defines a second longitudinal central axis and the first longitudinal central axis is spaced apart and parallel to the second longitudinal central axis.

16. The submerged intake filter assembly of claim 15, wherein the at least one secondary inlet pipe comprises a single secondary inlet pipe positioned in the annular space and extending into the interior of the cylindrical screen through the first end of the cylindrical screen.

17. The submerged intake filter assembly of claim 16, wherein the round inlet pipe extends further into the interior of the cylindrical screen than does the secondary inlet pipe.

18. The submerged intake filter assembly of claim 16, wherein the secondary inlet pipe extends into the interior of the cylindrical screen at an angle to the first longitudinal axis.

19. The submerged intake filter assembly of claim 15, wherein the at least one secondary inlet pipe comprises a plurality of secondary inlet pipes, each positioned in the annular space and extending into the interior of the cylindrical screen through the first end of the cylindrical screen.

20. The submerged intake filter assembly of claim 19, wherein at least two of the plurality of secondary inlet pipes extend different distances into the interior of the cylindrical screen.

21. The submerged intake filter assembly of claim 19, wherein the plurality of secondary inlet pipes extend into the interior of the cylindrical screen at an angle to the first longitudinal axis.

22. A submerged intake filter assembly comprising:
   a cylindrical screen having a screen longitudinal axis, a first end and a second end, the cylindrical screen defining an interior between the first end and the second end;
   a primary flow modifier pipe having a diameter less than that of the cylindrical screen and a primary longitudinal axis parallel to the screen longitudinal axis, the primary flow modifier pipe extending into the interior of the cylindrical screen through the first end of the cylindrical screen, thereby forming an annular space between the primary flow modifier pipe and the first end of the screen;
   a secondary flow modifier pipe having an interior completely positioned in the annular space and extending into the interior of the cylindrical screen; and
   a second secondary flow modifier pipe having a second secondary longitudinal axis and an interior completely positioned in the annular space and extending into the interior of the cylindrical screen, wherein the secondary flow modifier pipe defines a secondary longitudinal axis, the secondary longitudinal axis and the second secondary longitudinal axis being positioned different distances from the primary longitudinal axis.

23. The submerged intake filter assembly of claim 22, wherein secondary flow modifier pipe defines a secondary longitudinal axis that is at an angle to the primary longitudinal axis.

24. The submerged intake filter assembly of claim 23, further comprising a second secondary flow modifier pipe positioned in the annular space and extending into the interior of the cylindrical screen, the second secondary flow modifier pipe extending into the screen interior a different distance from the secondary flow modifier pipe.

25. The submerged intake filter assembly of claim 22, wherein the primary flow modifier pipe and the cylindrical screen are eccentric at the first end.

26. The submerged intake filter assembly of claim 22, wherein the primary flow modifier pipe includes a primary inlet end and the secondary flow modifier pipe includes a secondary inlet end and the secondary inlet end extends further into the interior of the cylindrical screen than does the primary inlet end.

27. The submerged intake filter assembly of claim 26, further comprising a second secondary flow modifier pipe positioned in the annular space and extending into the interior of the cylindrical screen, the second secondary flow modifier pipe extending into the screen interior a different distance from the secondary flow modifier pipe.

28. The submerged intake filter assembly of claim 22, wherein the primary flow modifier pipe includes a primary inlet end and the secondary flow modifier pipe includes a secondary inlet end and the primary inlet end extends further into the interior of the cylindrical screen than does the secondary inlet end.

29. The submerged intake filter assembly of claim 28, further comprising a second secondary flow modifier pipe positioned in the annular space and extending into the interior of the cylindrical screen, the second secondary flow modifier pipe extending into the screen interior a different distance from the secondary flow modifier pipe.

30. A submerged intake filter assembly comprising:
   a cylindrical screen having a screen longitudinal axis, a first end, and a second end, the cylindrical screen defining an interior between the first end and the second end;
   a primary flow modifier pipe having a diameter less than that of the cylindrical screen and a primary longitudinal axis parallel to the screen longitudinal axis, the primary flow modifier pipe extending into the interior of the cylindrical screen through the first end of the cylindrical screen, thereby forming an annular space between the primary flow modifier pipe and the cylindrical screen; and
   a secondary flow modifier pipe positioned in the annular space and extending into the interior of the cylindrical screen, wherein the secondary flow modifier pipe defines a secondary longitudinal axis that is at an angle to the primary longitudinal axis.

31. A submerged intake filter assembly comprising:
   a cylindrical screen having a screen longitudinal axis, a first end, and a second end, the cylindrical screen defining an interior between the first end and the second end;
   a primary flow modifier pipe having a diameter less than that of the cylindrical screen and a primary longitudinal axis parallel to the screen longitudinal axis, the primary flow modifier pipe extending into the interior of the cylindrical screen through the first end of the cylindrical screen, thereby forming an annular space between the primary flow modifier pipe and the cylindrical screen;
   a secondary flow modifier pipe positioned in the annular space and extending into the interior of the cylindrical screen; and
   a second secondary flow modifier pipe having a second secondary longitudinal axis positioned in the annular space and extending into the interior of the cylindrical screen, wherein the secondary flow modifier pipe defines a secondary longitudinal axis, the secondary longitudinal axis and the second secondary longitudinal axis being positioned at a distance from the primary longitudinal axis.

* * * * *